United States Patent
Lewis (10) Patent No.: US 10,332,185 B2
(45) Date of Patent: Jun. 25, 2019

(54) USING STATUS OF SIGN-ON TO ONLINE SERVICES FOR CONTENT ITEM RECOMMENDATIONS

(71) Applicant: Google LLC, Mountain View, CA (US)

(72) Inventor: Justin Lewis, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 704 days.

(21) Appl. No.: 14/711,625

(22) Filed: May 13, 2015

(65) Prior Publication Data

US 2015/0339755 A1    Nov. 26, 2015

Related U.S. Application Data

(60) Provisional application No. 62/002,071, filed on May 22, 2014.

(51) Int. Cl.
| | | |
|---|---|---|
| *G06Q 30/00* | (2012.01) | |
| *G06Q 30/06* | (2012.01) | |
| *G06Q 50/00* | (2012.01) | |
| *G06Q 50/10* | (2012.01) | |

(52) U.S. Cl.
CPC ......... *G06Q 30/0631* (2013.01); *G06Q 50/01* (2013.01); *G06Q 50/10* (2013.01)

(58) Field of Classification Search
CPC .............................................. G06Q 30/00–08
See application file for complete search history.

(56) References Cited

U.S. PATENT DOCUMENTS

| | | | |
|---|---|---|---|
| 8,091,032 B2* | 1/2012 | Fischer | ............ G06F 17/30867 |
| | | | 707/748 |
| 8,200,661 B1 | 6/2012 | Pearce et al. | |
| 8,589,434 B2 | 11/2013 | Liebald et al. | |
| 2009/0177744 A1* | 7/2009 | Marlow | ................. G06Q 10/10 |
| | | | 709/204 |
| 2011/0145040 A1 | 6/2011 | Zahn et al. | |
| 2012/0297038 A1 | 11/2012 | Mei et al. | |
| 2013/0080592 A1 | 3/2013 | Budd et al. | |

FOREIGN PATENT DOCUMENTS

| | | |
|---|---|---|
| CN | 102812432 | 12/2012 |
| CN | 103198418 | 7/2013 |

(Continued)

OTHER PUBLICATIONS

PCT International Search Report and Written Opinion, PCT Application No. PCT/US2015/030805, dated Aug. 20, 2015, fourteen pages.

(Continued)

*Primary Examiner* — Michael Misiaszek
(74) *Attorney, Agent, or Firm* — Byrne Poh LLP (57) ABSTRACT

An SSO provider—i.e., a provider of user accounts that a number of other online services accept as a sign-on technique—identifies the online services to which its users sign on, as well as the digital content items that those users access. The SSO provider uses this information to associate particular content items with particular online services, or combinations of online services. The SSO provider can then use the associations to make recommendations of content items to users based on the services to which the users have signed on.

18 Claims, 8 Drawing Sheets

(56) References Cited

FOREIGN PATENT DOCUMENTS

| WO | 2011/133403 | 4/2011 |
| WO | WO-2013/133879 A1 | 9/2013 |

OTHER PUBLICATIONS

Pessemier, T. et al., Context Aware Recommendations for User-generated Content on a Social Network Site, *EuroITV'09*, Jun. 3-5, 2009, Leuven, Belgium, pp. 133-136.

International Preliminary Report on Patentability dated Nov. 22, 2016 in International Patent Application No. PCT/US2015/030805.

Supplementary European Search Report dated Sep. 29, 2017 in EP Patent Application No. 15795952.9.

Office Action dated Jan. 28, 2019 in CN Patent Application No. 201580025950.2.

\* cited by examiner

USING STATUS OF SIGN-ON TO ONLINE SERVICES FOR CONTENT ITEM RECOMMENDATIONS

CROSS REFERENCE TO RELATED APPLICATIONS

This application claims the benefit of U.S. Provisional Application 62/002,071, filed on May 22, 2014, which is incorporated by reference.

BACKGROUND

1. Field

The described embodiments generally relate to the field of digital content items, and more specifically, to making user recommendations of digital content items based on knowledge of prior user sign-ons to online services.

2. Background

The ability of a digital content provider—such as a provider of digital videos, audio, or books—to anticipate the particular digital content items in which a user might be interested, and to provide recommendations of those digital content items to the user, greatly increases the value of the digital content provider to the user. Unlike in the physical world where consumers rent or purchase books, movies and other tangible content items in discrete packages from a constrained supply, in the digital world substantially greater content is available, typically at low or no cost, and the ability to recommend content to a consumer is particularly important. That is, the availability of resources enabled by the Internet creates problems without an offline analogue, and which require solutions that, equally, have no offline analogue. One challenge for the digital content provider is to identify the type of information about a user that will allow the content provider to predict the content items that would be of interest to that user, and to properly process that information in order to generate recommendations.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
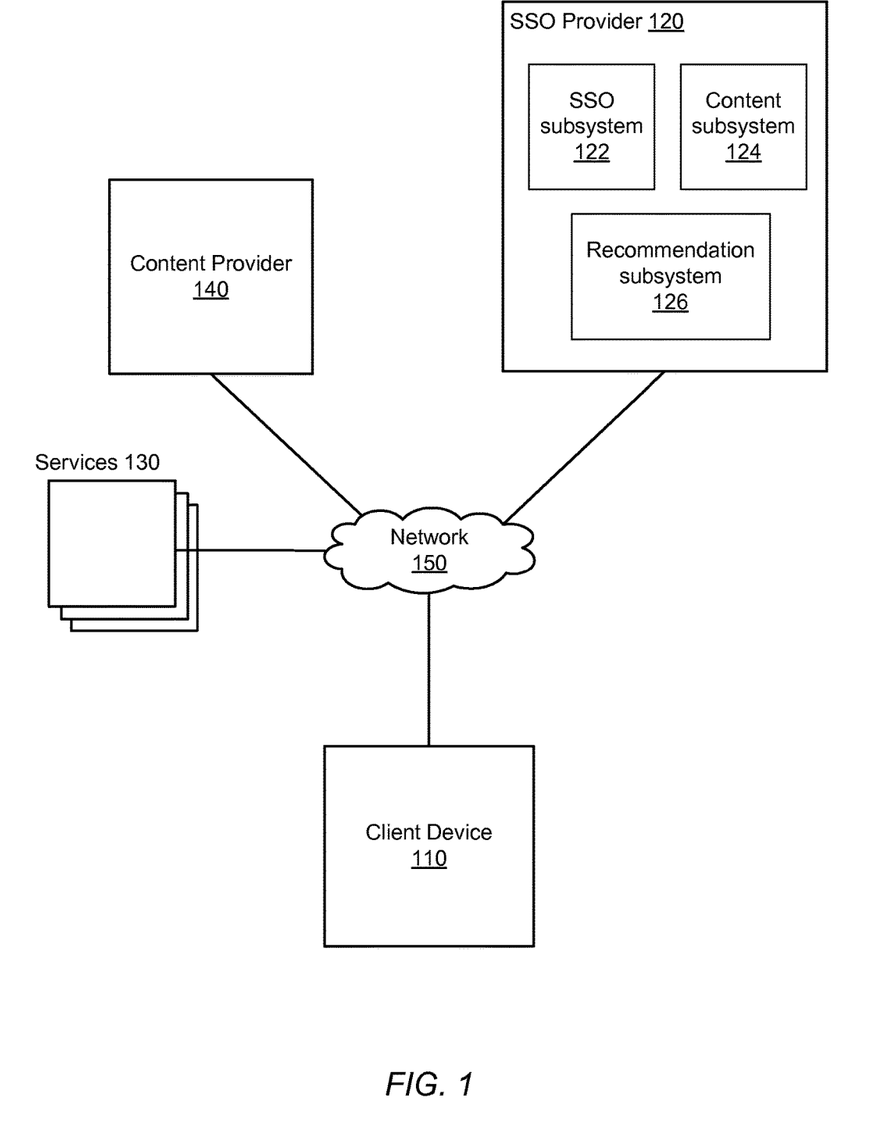
FIG. 1 illustrates a computing environment in which users use their client devices to use online services and to access digital content items, according to one embodiment.

FIG. 1 illustrates a computing environment in which users use their client devices to use online services and to access digital content items over a network, according to one embodiment.

Client devices 110 are computing devices that execute client software, e.g., a web browser or custom client application, to connect to other systems for purposes such as signing onto and using services, accessing digital content items such as videos, audio, books, and the like. The client device 110 could be, for example, a personal computer, a personal digital assistant, a cellular, mobile, or smart phone, or a laptop computer.

The online services 130 are services available to users via the network 150. The services 130 are typically made available as web-based applications accessed and used via a browser or a specialized application of a client device 110. The services 130 may provide any number of different types of content or functionality, such as online video, social networking, video text message distribution, or the like. A service 130 may require users to provide credentials (e.g., a username and password) to sign on to the service before allowing the user to access the service's functionality. Some specific examples of possible services 130 include services such as Pinterest, LinkedIn, Twitter, Pandora, and Skype.

The social sign-on provider 120 (hereinafter "SSO provider") is a system on which users create social sign-on accounts, the social sign-on accounts of the SSO provider being accepted by the services 130 as one way of establishing the users' identities and thus signing on to the services. As one specific example of an SSO provider 120, Google allows users to create Google accounts, and many services 130 accept those social sign-on accounts as a means of signing on to the services, as an alternative to credentials that are specific to the services. The social sign-on functionality is embodied in an SSO subsystem 122 of the SSO provider 120.

In one embodiment described throughout the remainder of this disclosure, the SSO provider 120 additionally provides access to digital content items via a content subsystem 124. For example, the content subsystem 124 might provide access to digital videos, or digital books or other publications. In other embodiments, access to content items is alternatively and/or additionally provided by one or more content providers 140 that are separate from, and operated by an organization independent of, the SSO provider 120.

Information about the services 130 to which a user signs in often proves valuable in identifying the content items in which the user might be interested. For example, users of a particular social network service might represent a very different demographic group, and hence have interests in very different content items, from the users of a business videoconferencing service. Having granular knowledge of the different combinations of services 130 that a user uses can provide even greater insight. Accordingly, the SSO provider 120 additionally comprises a recommendation subsystem 126 that takes the use of service 130 into account when identifying content items in which users might be interested. More specifically, the recommendation subsystem 126 takes, as input, a list of the services 130 to which users have signed on (e.g., as determined by the SSO subsystem 122), and a list of digital content items that the users have accessed (e.g., as determined by the content subsystem 124). The recommendation subsystem 126 processes the input to identify distinct groups of users corresponding to the various services 130, and also constructs content profiles for the groups based on the digital content items that the users have accessed. The recommendation subsystem 120 can then use the content profiles to predict content items for which a user will have an affinity, either directly providing the recommendations to the user, or using the recommendations to filter, or be filtered by, recommendations generated using different techniques.

The network 150 may be any suitable communications network for data transmission. The network 150 uses standard communications technologies and/or protocols and can include the Internet. In another embodiment, the entities use custom and/or dedicated data communications technologies.

Note that in FIG. 1, for the sake of clarity only one instance of client device 110 and content provider 140 and is shown, though there could be any number of each.

Figure 2:
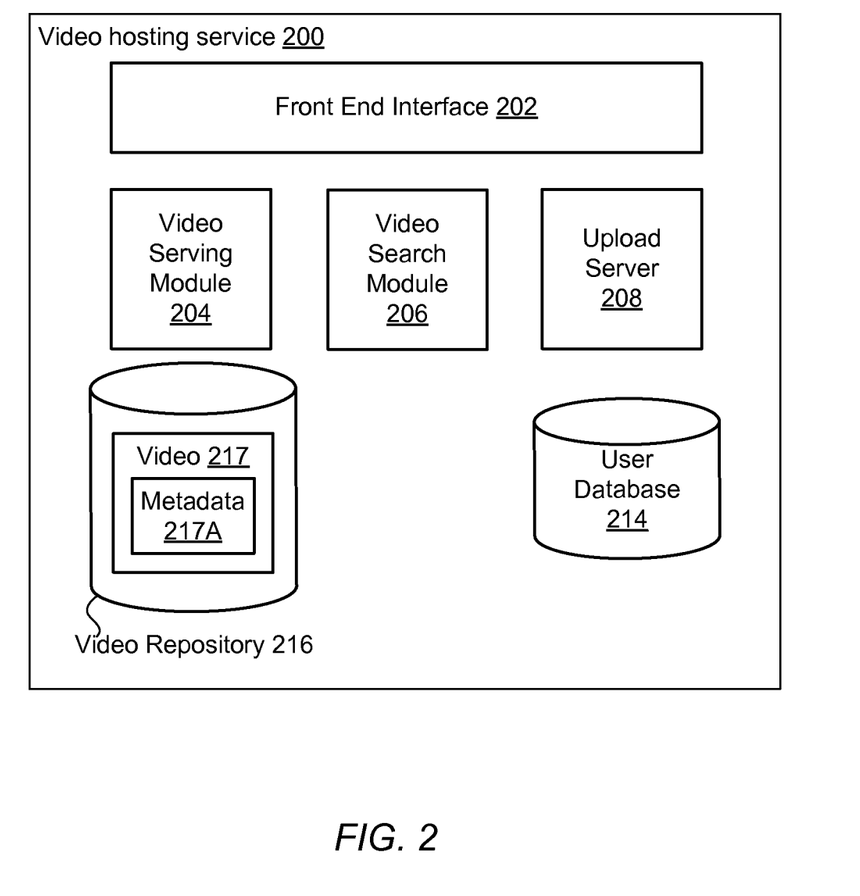
FIG. 2 is a block diagram of one example of the content subsystem of FIG. 1, according to one embodiment.

FIG. 2 is a block diagram of one example of the content subsystem 124, according to one embodiment: namely, a video hosting service 200 for providing digital video. It is appreciated that digital content items other than digital video may be provided in other embodiments.

The video hosting service 200 represents a system such as that of YouTube that stores and provides videos to clients such as the client device 110, including both user-generated videos and commercially/professionally generated ones. The video hosting service 200 communicates with a plurality of content providers (not shown) and client devices 110 via the network 150 to facilitate sharing of video content between users. The video hosting service 200 additionally includes a front end interface 202, a video serving module 204, a video search module 206, an upload server 208, a user database 214, and a video repository 216. Other conventional features, such as firewalls, load balancers, authentication servers, application servers, failover servers, site management tools, and so forth are not shown so as to more clearly illustrate the features of the video hosting service 200. One example of a suitable service 200 is the YouTube website, found at www.youtube.com. The illustrated components of the video hosting service 200 can be implemented as single or multiple components of software and/or hardware. In general, functions described in one embodiment as being performed by one component can also be performed by other components in other embodiments, or by a combination of components. Furthermore, functions described in one embodiment as being performed by components of the video hosting service 200 can also be performed by one or more client devices 110 in other embodiments if appropriate.

Conceptually, the content provider is an entity that provides video content to the video hosting service 200 and the client device 110 views that content. In practice, some content providers (e.g., individual users who upload user generated content) may also be content viewers. Additionally, the content provider may be the same entity that operates the video hosting service 200.

The content provider operates a client device to perform various content provider functions. Content provider functions may include, for example, uploading a video file to the video hosting service 200, editing a video file stored by the video hosting service 200, or editing content provider preferences associated with a video file.

The client device 110 can be used to view video content stored by the video hosting service 200. Client device 110 may also be used to configure viewer preferences related to video content. In some embodiments, the client device 110 includes an embedded video player such as, for example, the Flash player from Adobe Systems, Inc. or any other player adapted for the video file formats used in the video hosting service 200.

The upload server 208 of the video hosting service 200 receives video content from a content provider, and processes the content for storage and playback. Received content is stored in the video repository 216. In response to requests from client devices 110, a video serving module 204 provides video data from the video repository 216 to the client devices 110. Client devices 110 may also search for videos of interest stored in the video repository 216 using a video search module 206, such as by entering textual queries containing keywords of interest, or may browse videos using functionality such as playlists, channels, or recommendations. Front end interface 202 provides the interface between client device 110 and the various components of the video hosting service 200.

In some embodiments, the user database 214 is configured for maintaining a record of all registered users of the video hosting service 200. Registered users include content providers and/or users of client devices 110 who simply view videos on the video hosting service 200. Each content provider and/or individual user registers account information including, which may include login name, electronic mail (e-mail) address and password with the video hosting service 200, and is provided with a unique user ID. The user ID can be based on any identifying information, such as the user's IP address, user name, or the like. This account information is stored in the user database 214. Users have the opportunity to specify that the account information not be shared with other components of the video hosting service 200, or with other third-party systems.

The video repository 216 contains a set of videos 217 submitted by users. The video repository 216 can contain any number of videos 217, such as tens of thousands or hundreds of millions. Each of the videos 217 has a unique video identifier that distinguishes it from each of the other videos, such as a textual name (e.g., the string "a91qrx8"), an integer, or any other way of uniquely naming a video. The videos 217 can be packaged in various containers such as AVI, MP4, or MOV, WebM, and can be encoded using video codecs such as VP8, MPEG-2, MPEG-4, H.264, and the like.

In addition to their audiovisual content, the videos 217 further have associated metadata 217A. In one embodiment, the metadata 217A includes textual metadata such as a video title, a video description, and/or tags provided by a user who uploaded the video, as well as user comments provided by users viewing the video. The metadata 217A may also include an uploader-specified category designating one of a set of categories specified by the video hosting service 200, such as sports, entertainment, music, or the like. Although such textual metadata are typically provided by the video uploader and/or other users, they may also be provided or modified automatically by the video hosting service 200.

Figure 3:
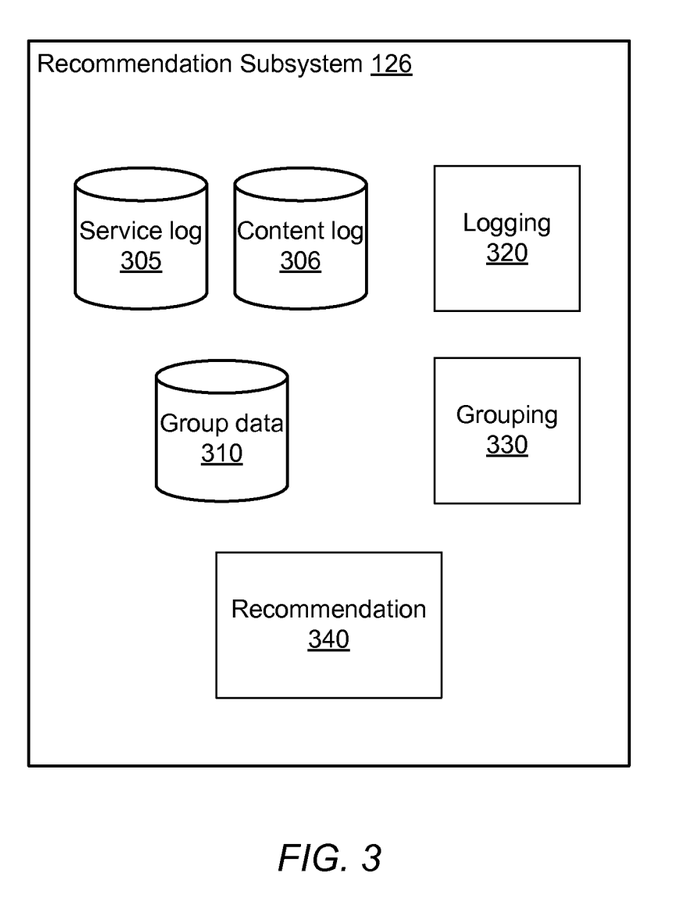
FIG. 3 illustrates components of the recommendation subsystem of FIG. 1, according to one embodiment.

FIG. 3 illustrates components of the recommendation subsystem 126 of the SSO provider 120 of FIG. 1, according to one embodiment.

A logging module 320 of the recommendation subsystem 126 generates a service log 305 and a content log 306 based on the actions of the various users of the SSO provider 120. A grouping module 330 uses the service log 305 and the content log 306 as input to generate group data 310, which a recommendation module 340 uses to provide recommendations of content items to users. These components are now described in more detail.

The service log 305 includes entries that associate particular users with the services 130 to which they have signed on. In one embodiment, the SSO subsystem 122 of the SSO provider 120 notifies the recommendation subsystem 126 when a user has signed on to a service, and the logging module 320 accordingly creates an entry <u, s> in the service log 305, where u is a unique identifier of the user on the SSO provider 120, and s is a unique identifier of the service 130.

The content log 306 includes entries that associate particular users with the content items (e.g., digital videos) that they have accessed. In one embodiment, the content subsystem 124 of the SSO provider 120 notifies the recommendation subsystem 126 when a user has accessed a content item, and the logging module 320 accordingly creates an entry <u, c> in the content log 306, where u is a unique identifier of the user on the SSO provider 120, and c is a unique identifier of the content item that was accessed. Entries in the content log 306 can include more information than simply the tuple <u, c>. For example, the entries could also include a wide variety of other information, such as the date and time of access, or the nature of the access (e.g., play a video content item, pause the video, etc.).

The recommendation subsystem 126 can later use the logged associations to establish associations between different services and content items.

Data within the service log 305 and the content log 306 can be arranged in different manners in different embodiments. For example, rather than storing an entry <u, s> for each sign-on to a service s (or <u, c> for each access of a content item c), the service log 305 could store a single entry <u, S> for each user u, where S represents a list of all the services s to which the user u has signed on. Similarly, the content log 306 could store a single entry <u, C> for each user u.

Additionally, in one embodiment, the recommendation subsystem 126 notifies users of the type of information that is stored in the logs 305 and 306 and provides the user the opportunity to opt-out of having such information collected and stored.

As previously noted, in some embodiments the SSO provider 120 does not have a content subsystem 124, and the content items are instead provided by separate content providers 140. In such embodiments, the recommendation subsystem 126 does not obtain notification of the user accesses of content items directly from the SSO provider 120, but rather obtains the notification from the content providers 140. For example, the content providers 140 may provide notification of the content item accesses to the recommendation subsystem 126, or the recommendation subsystem may query the content providers 140 to obtain the notifications.

The grouping module 330 uses the service log 305 and the content log 306 as input to generate group data 310.

In one embodiment, the grouping module 330 groups the users according to the services 130 that they have been observed to use (as recorded in the <u, s> entries in the service log 305), with a separate group for each distinct set of services. A set of services is considered to be distinct from other sets if it does not contain precisely the same services as any of the other sets. As a simplified example, assuming that there were only three known services, A, B, and C, a first group might correspond to users using service A but not B or C; a second group to users using service A and B but not C; a third group to users using B and C but not A; and so forth. The set of services (namely, A) of the first group is considered distinct from the set of services (namely, A and B) of the second group, for example, because the sets {A} and {A, B} are not precisely the same sets—for instance, although {A, B} includes A, {A} does not include B.

For some or all of the groups, the grouping module 330 identifies a set of the content items accessed by the users of the group. For example, in one embodiment the grouping module 330 forms the union of content items accessed by any user of the group. In one embodiment, the accesses are limited to a particular time period, such as the prior four weeks.

In one embodiment the grouping module 330 then identifies a subset of those content items, such as the content items known to be most popular. Popularity may be determined according to different metrics in different embodiments, such as by an aggregate number of accesses by users in the group, or by a normalized number of accesses, such the total number of accesses of the content item by users in the group relative to the total number of accesses of the content item by all users regardless of group. (For example, for a group with 10,000 users, assume that content item A was accessed 5,000 times (versus 1,000,000 times by all users), and content item B 1,000 times (versus 100,000 times by all users). The normalized comparative popularity for content item A could be computed as 5,000/1,000,000=0.005, and 1,000/100,000=0.01 for content item B. Thus, content item B would be more likely to be associated with the group than content item A due to its comparative popularity with the group, even though it was viewed fewer total times by the group.) The identified subset of the accessed content items (such as the most popular content items) is then associated with the group as the set of relevant content items.

In another embodiment, the set of videos accessed by the group (or a subset thereof) is not directly associated with the group, but rather is used to train a classifier for recognizing the types of content items that users within the group typically access, and hence would tend to be interested in. For example, some or all of the videos accessed by users of the group are placed into a positive training set, and videos not accessed by users of the group are placed into a negative training set. Features are then extracted from the videos in the positive and negative training set. The features may include content features derived directly or indirectly from content of the content items. For example, where the content items are videos, the content features can include features derived directly or indirectly from metadata of the content items, such as features sampled using a Laplacian-of-Gaussian (LoG) or Scale Invariant Feature Transform (SIFT) feature extractor, a color histogram computed using hue and saturation in HSV color space, motion rigidity features, texture features, and/or filter responses (e.g., derived from Gabor wavelets). The features may also include metadata features derived from textual metadata associated with the content items (e.g., title, description, or tag metadata for digital videos), uploader features describing information known about users who uploaded the content items (e.g., demographic information provided by users in their user profiles), information about the uploading of the content items (e.g., time or location of upload), and the like. The features of the positive and negative training sets are then provided as input to a training algorithm, such as an ensemble learning algorithm (e.g., a Support Vector Machines (SVM) algorithm, or boosting algorithms such as AdaBoost). The result is a classifier for the group that, when given a content item as input, outputs a score indicating a likelihood that a member of the group would be interested in the content item. Content items are then selected for association with the group by applying the classifier for the group to a number of content items, ranking the content items based on their resulting classifier scores, and selecting the highest-scoring content items.

Figure 4:
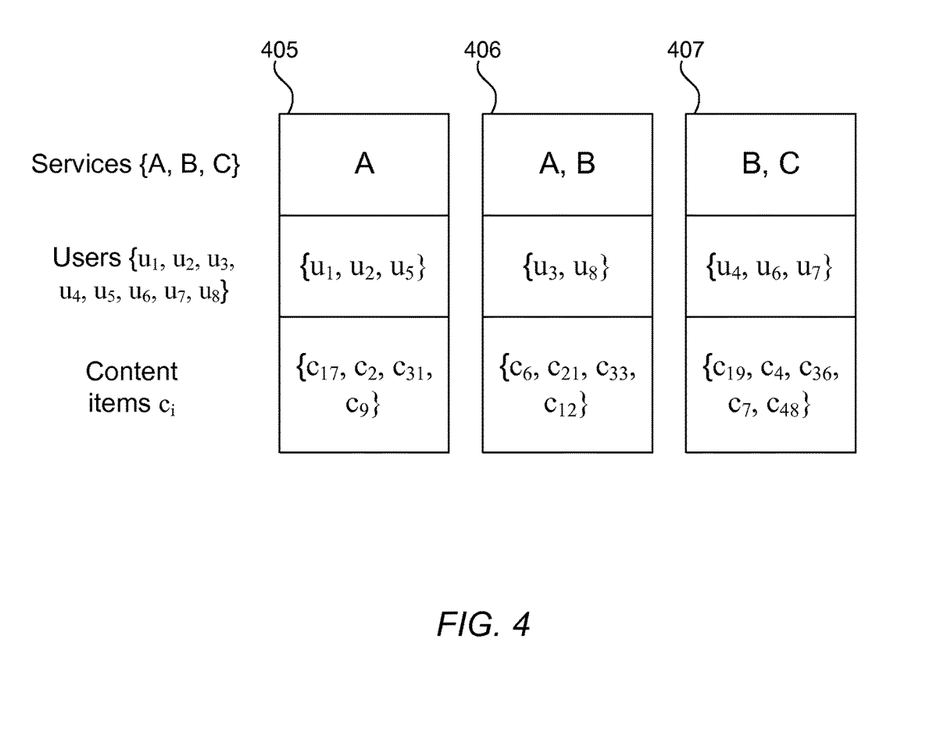
FIG. 4 illustrates contents of the group data of FIG. 3 for a simplified example scenario, according to one embodiment.

FIG. 4 illustrates contents of the group data 310 of FIG. 3 for the simplified example described above, according to one embodiment. The group data 310 includes a first group 405 corresponding to a set of users ($u_1$, $u_2$, and $u_5$) who signed on to service A, but not services B or C; a second group 406 corresponding to a set of users ($u_3$ and $u_8$) who signed on to services A and B, but not service C; and a third group 407 corresponding to a set of users ($u_4$, $u_6$, and $u_8$) who signed on to services B and C, but not service A. The groups 405-407 are further respectively associated with a set of content items $\{c_{17}, c_2, c_{31}, \text{and } c_9\}$, $\{c_6, c_{21}, c_{33}, \text{and } c_{12}\}$, and $\{c_{19}, c_4, c_{36}, c_7, \text{and } c_{48}\}$, e.g., based on the comparative popularity of those content items with their respective groups.

Referring again to FIG. 3, the recommendation module 340 of the recommendation subsystem 126 provides recommendations of content items to a user based on the group data 310. More specifically, the recommendation module 340 uses the group data 310 to identify the user's group, and the set of content items associated with the user's group. For example, referring back to the example of FIG. 4, when providing recommendations to user $u_8$, the recommendation module 340 would determine that $u_8$ is within the second group 406, and that the set of content items associated with that group is $\{c_6, c_{21}, c_{33}, \text{and } c_{12}\}$.

The recommendation module 340 then recommends some or all of the associated set of content items to the user. The recommendation module 340 may optionally not recommend content items that the user has previously accessed, either at any point, or within a given time period. For example, the recommendation module 340 could consult the content log 306, or some other access log of the SSO subsystem 122 or other content provider 140, and suppress recommendations of any content items that the user has previously accessed. Continuing the above example, if user $u_8$ had previously accessed content items $c_{21}$ and $c_{33}$, the recommendation module 340 might recommend only $c_6$ and $c_{12}$. Providing a recommendation may be accomplished in different manners, but in one embodiment involves graphically including the recommendations within a web-based user interface, such as that of FIG. 7, described later below.

In one embodiment, the recommendations of the recommendation module 340 need not be provided directly to the user, but rather are used in conjunction with other sources of recommendations to determine a final set of recommendations. For example, a first set of recommendations might be determined by the recommendation module 340 based on the group data 310; a second set of recommendations might be determined by a different module that forms the recommendations purely based on profile data explicitly specified by the user (e.g., his or her favorite TV shows); and the recommendations could be combined to form a final set of recommendations for the user (e.g., by taking the intersection of the content items in the first and second set of recommendations).

In one embodiment, the logging module 320 obtains data correlating services 130 with content items without users having used the SSO provider 120 for sign-on to the other services 130. Rather, the services 130 act as referrers to content items provided by the content subsystem 124 of the SSO provider, and the referrer information is used to correlate the requested content items with the referring services. Specifically, the SSO provider 120 maps the "Referer" field of a request for a content item to the service from which the request originated. The content item then can be added to the set of content items known to have been accessed via the particular service 130, and may additionally be selected as one of the set of content items associated with the service, as in FIG. 4.

For example, a particular social networking service 130 might display a web page including a post with a link to a content item hosted by the content subsystem 124 of the SSO provider 120. When a user of the social networking service 130 clicks on the link, the browser or other application of the client device 110 of the user sends a hypertext transfer protocol (HTTP) request to the content subsystem 124, with the "Referer" header field set to the URL of the web page of the social networking service 130 on which the link was clicked. The logging module 320 of the SSO provider 120 maps the URL of the web page to an identifier of the social networking service 130 and associates the service 130 with the requested content item.

Example Interactions

Figure 5:
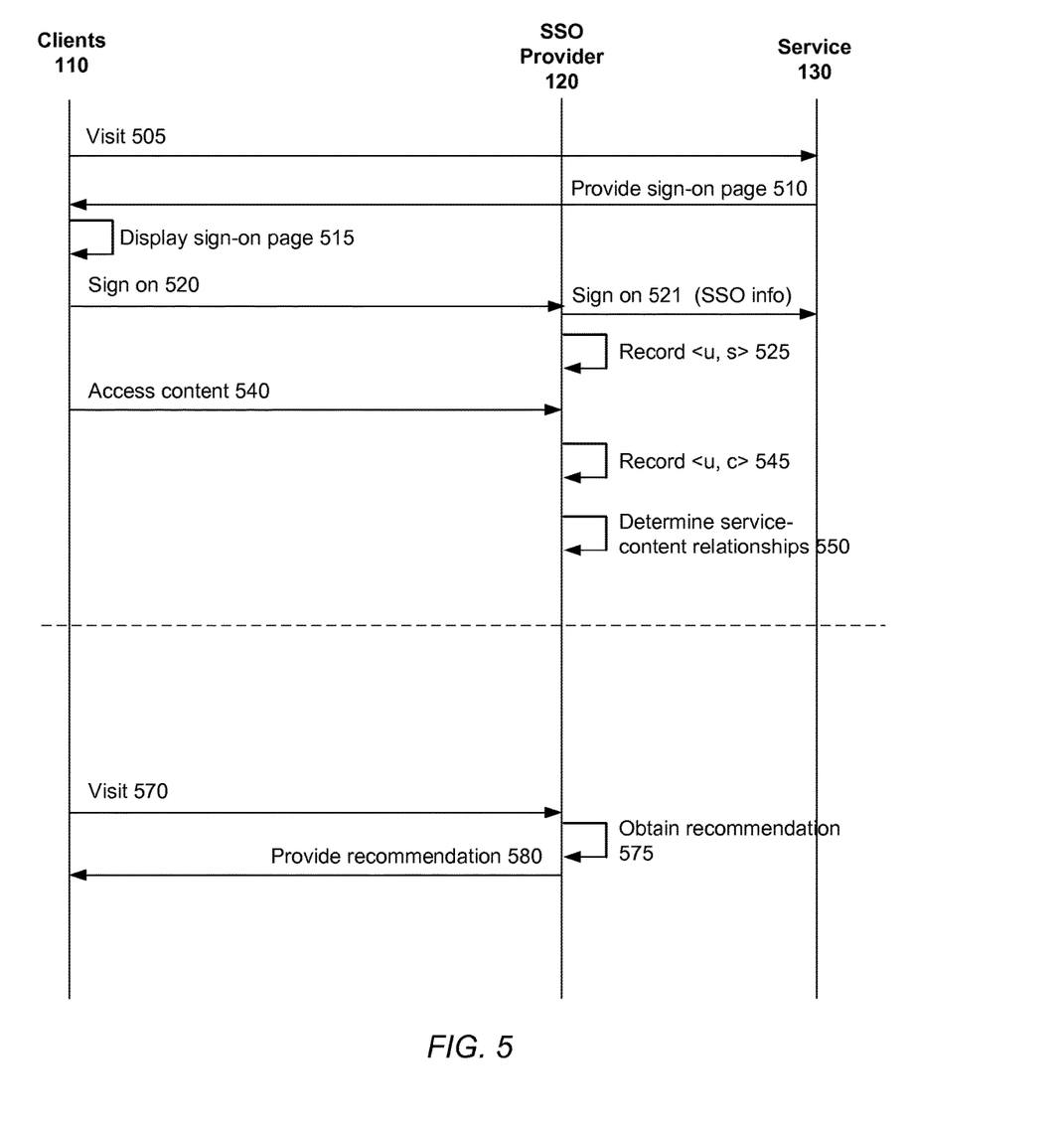
FIG. 5 illustrates interactions between the various components of FIG. 1 when learning associations between services and content items, and when providing recommendations based upon the learned relationships, according to one embodiment.

FIG. 5 illustrates interactions between the various components of FIG. 1 when learning associations between services and content items, and when providing recommendations based upon the learned associations, according to one embodiment.

Figure 6A:
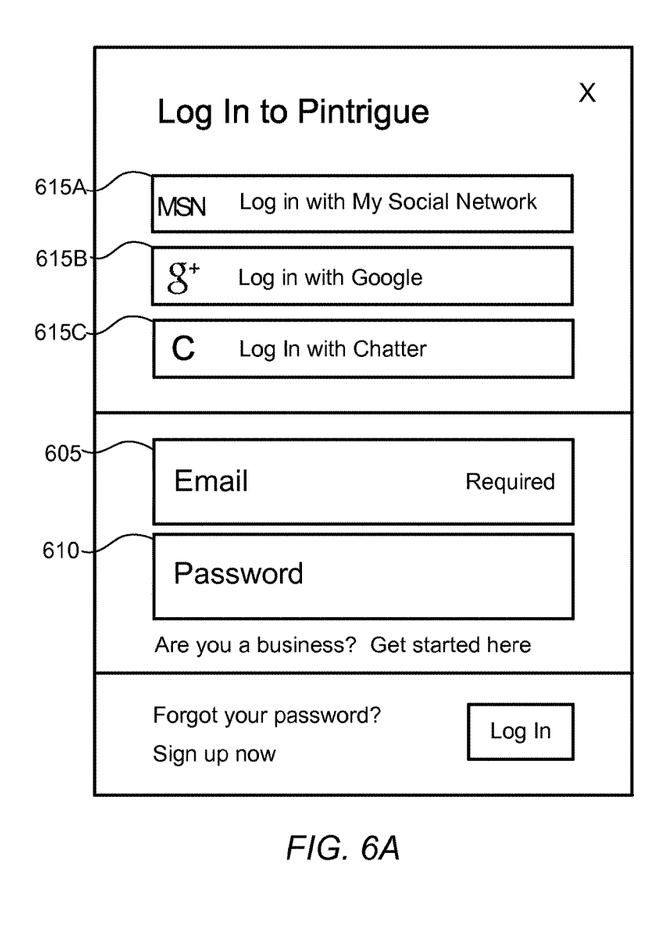
FIGS. 6A and 6B illustrate examples of sign-on user interfaces for a service and for an SSO provider, respectively.
Figure 6B:
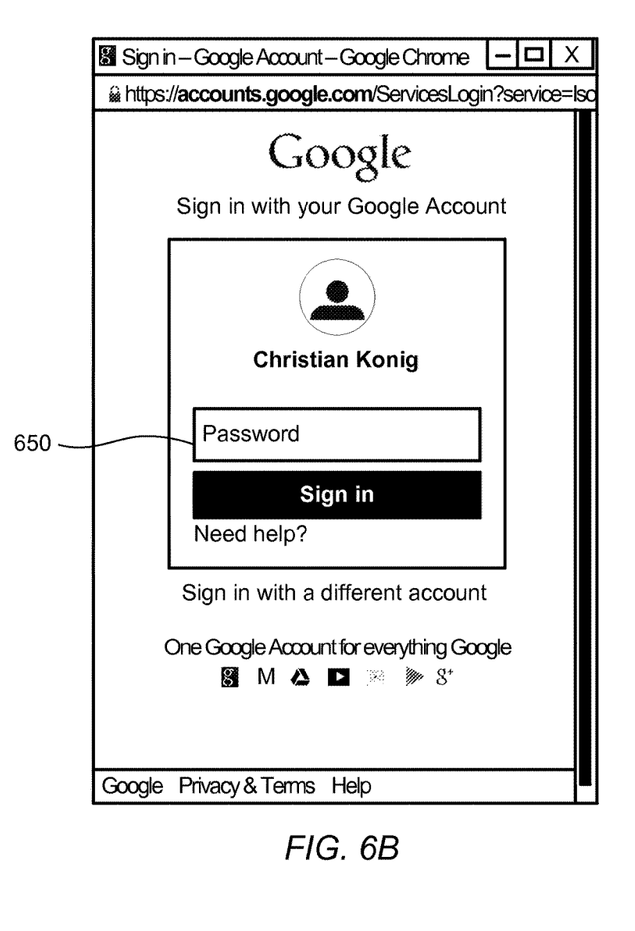

A user of a client device 110 visits 505 a service 130, and the service accordingly provides 510 a sign-on page, which the client device displays 515. As one specific example, FIG. 6A illustrates the sign-on page for a particular service 130. The service 130 provides different sign-on options, including explicitly entering credentials such as e-mail 605 and password 610, and (as an alternative) logging in via one of the SSO providers 615A-C. If the user elects to sign on to the service 130 using one of the SSO providers 120 and is not already signed on to that provider, the sign-on page for that service is displayed, as in FIG. 6B. The user can then enter his or her credentials (e.g., the password illustrated in area 650) to sign onto the service.

Referring again to FIG. 5, the user uses the client device 110 to sign on 520 to the service 130. More specifically, assuming that the user elects to sign on to the service using one of the SSO providers 120 (e.g., via selections 615 of FIG. 6A), the sign-on page of the service 130 uses the API of the selected SSO provider 120 to cause the SSO provider to carry out the sign-on 521 by providing credentials of the user on the SSO to the service 130.

Along with providing the credentials of the user to the service 130, the SSO provider 120 records 525 that the particular user has an account on the service 130. For example, in one embodiment the SSO provider 120 creates an entry <u, s> in the service log 305, where u is a unique identifier of the user, and s is a unique identifier of the service 130. The SSO provider 120 can later use the connection between u and s to establish a relationship between different services and different content items.

After the user has been signed on 521 to the service 130, the user uses the client device 110 to access 540 content items, and the SSO provider 120 accordingly records 545 the accesses. In one embodiment the SSO provider 120 creates an entry <u, c> in the content log 306 for each user access with a content item, or (where an entry <u, c> already exists) increments a count of the accesses, where u is a unique identifier of the user, and c is a unique identifier of the content item.

For the sake of simplicity, it is assumed that the SSO provider 120 also provides access to the content items, as well as providing the SSO service, and that therefore the SSO provider can directly observe the user accesses of the content items. It is appreciated, however, that in other embodiments the content items could be provided by a separate content provider 140, and that the SSO provider 120 would learn of the user accesses of the content items by (for example) periodically querying the separate content provider.

Having recorded the entries <u, s> and <u, c>, the SSO provider 120 determines 250 the relationships between services s and content items c. In one embodiment, the grouping module 330 of FIG. 3 groups the users according to their services 130 and generates the group data 310, as described above with respect to FIG. 3.

The end result of step 550 is a set of mappings between groups of services and some set of the videos accessed by users of those groups, as was previously described with respect to the example of FIG. 4.

Steps 505-550 need not be performed only a single time, but can be repeated over time. Thus, the identified groups can change over time, e.g., increasing in number as new services 130 come into existence. Additionally, the content items associated with a group can change over time, e.g., as certain content items cease to be accessed by users in the group within a given prior time period. The user associations with groups may also change, e.g., if a user stops signing on to a particular service or begins signing on to additional services.

The SSO provider can use the service-content relationships determined at step 550 to provide content item recommendations to users, e.g., as described above with respect to the recommendation module 340. For example, when the user visits 570 the SSO provider 120 to access content, the SSO provider looks up the user within the group data 310 to determine the group to which the user was determined to belong in step 550. The SSO provider 120 then identifies content items within the group data 310 that correspond to that group. The SSO provider 120 obtains 275 recommendations for the user by identifying some or all of the content items that correspond to the user's group. For example, the SSO provider 120 may choose, as recommendations, the top N of the content items that correspond to the group and that the user has not previously accessed.

The recommendations may be presented within their own region of a user interface, or they may be included along with recommendations obtained according to different algorithms, such as algorithms recommending content items related to other content items that the user has previously accessed, globally popular content items, or content items accessed by the user's connections on a social network. A recommendation of a content item for a user due to the content item being identified as corresponding to the group of the user in the group data 310 can also be factored in as one score component for an overall content item recommendation score determined according to multiple factors. For example, a content item may be recommended to a user because it obtained a high recommendation score based on the fact that it was a top content item for the user's group in the group data 310, it was viewed by a high percentage of the connections of the user on a social network, and it is globally popular across users, regardless of the particular user group.

In one embodiment, the recommendations can also include also content items corresponding to a subset of the services 130 to which the user has previously signed on. For example, the recommendations might include a set of content items popular with one of the services 130 that the user has signed onto most frequently.

Figure 7:
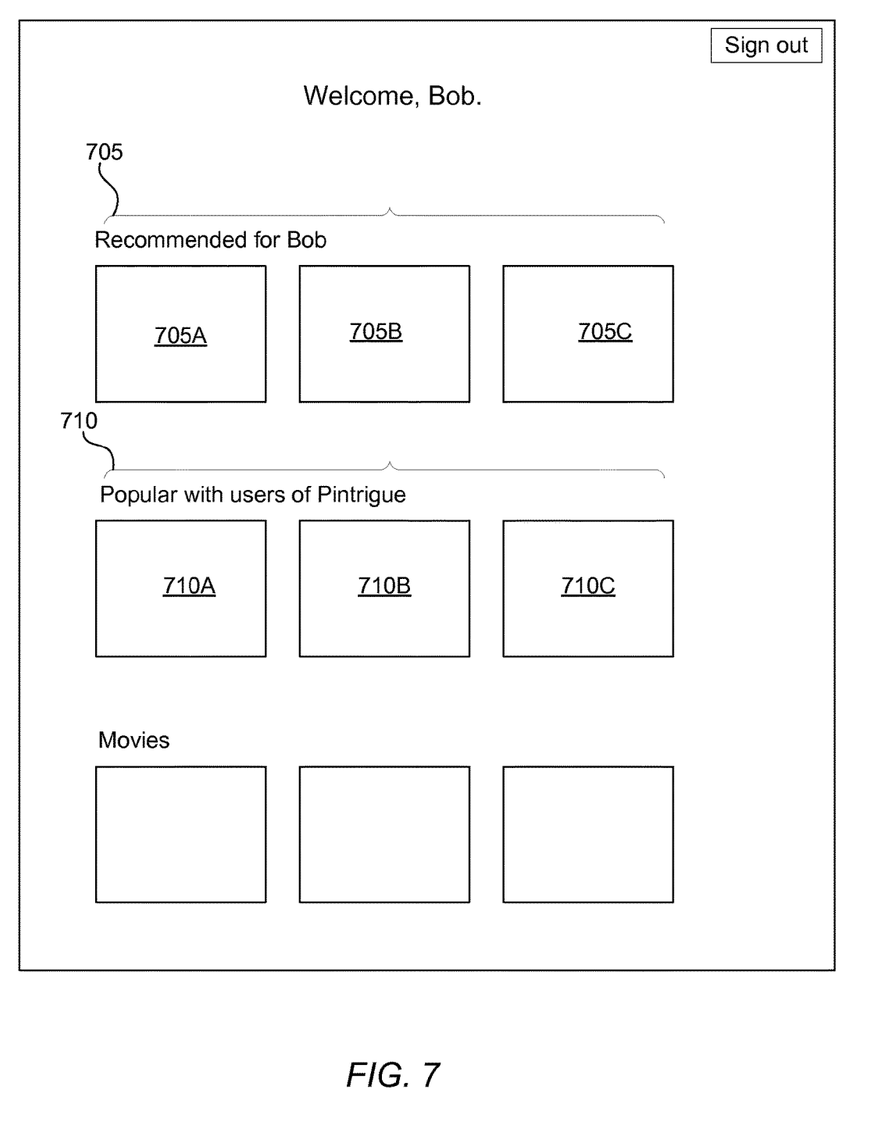
FIG. 7 illustrates one sample user interface for recommending video content items.

After obtaining the recommendations at step 275, the SSO provider 120 then provides the recommendations to the user. For example, FIG. 7 is a simplified illustration of one sample web-based user interface for recommending video content items to a particular user ("Bob"). Region 705 includes graphical indications of videos (705A-705C)—e.g., thumbnails—that are recommended for the user based on a variety of different factors, of which the user's service group (as determined by the grouping module 330) is one factor. Region 710 includes graphical indications of videos (710A-710C) that are recommended due to their popularity on one particular service 130 to which the user has been observed frequently to sign on.

As noted, in alternative embodiments the SSO provider 120 does not itself provide content items. In such a case, the user visits a separate content provider 140, and the content provider 140 requests content recommendations from the SSO provider 120, given the identity of the user.

Example Computer Architecture

Figure 8:
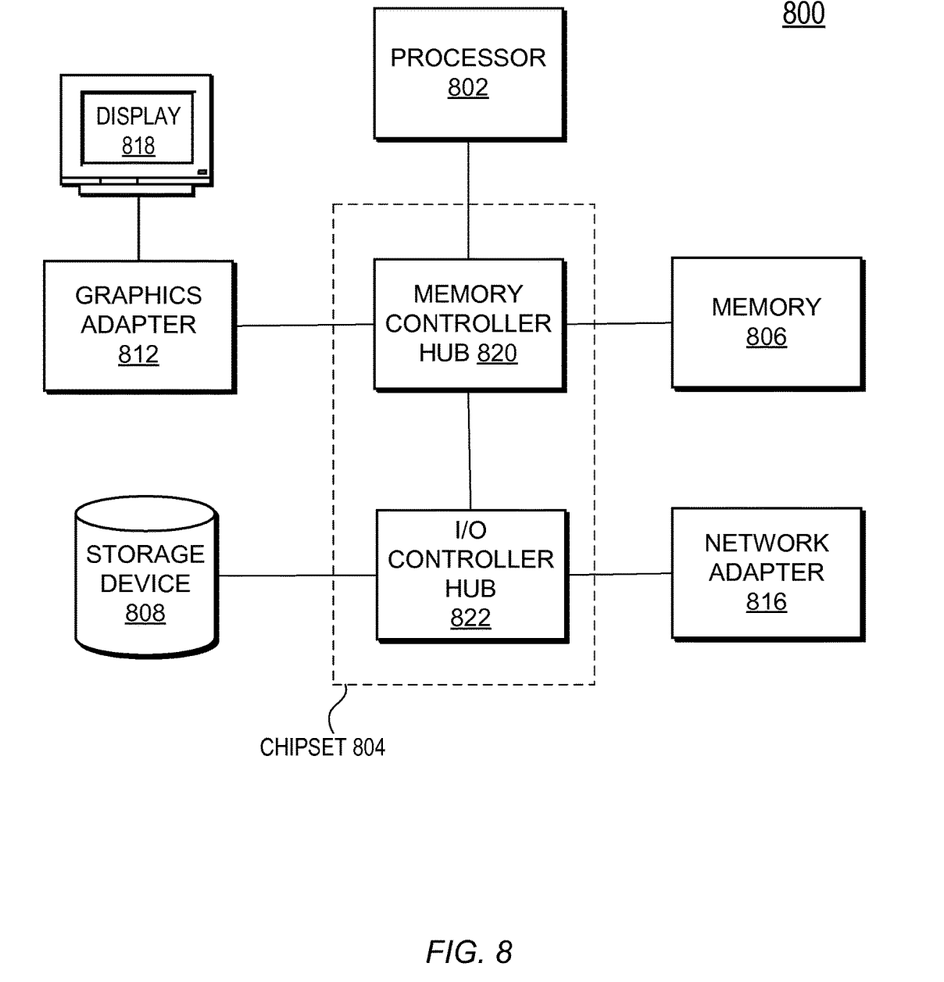
FIG. 8 is a block diagram illustrating physical components of a computer system, which can serve as all or a portion of the SSO provider or the client device of FIG. 1, according to one embodiment.

FIG. 8 is a block diagram illustrating physical components of a computer system 800, which can serve (for example) as all or a portion of the SSO provider 120, or the client device 110, of FIG. 1, according to one embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer 800. The graphics adapter 812 displays images and other information on the display 818. The network adapter 816 couples the computer system 800 to a local or wide area network.

As is known in the art, a computer system 800 can have different and/or other components than those shown in FIG. 8. In addition, the computer 800 can lack certain illustrated components. For example, in one embodiment, if a computer system 800 is a smartphone it may lack a keyboard 810, pointing device 814, and/or graphics adapter 812, and have a different form of display 818. Moreover, the storage device 808 can be local and/or remote from the computer 800 (such as embodied within a storage area network (SAN)).

As is known in the art, the computer system 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Embodiments of the entities described herein can include other and/or different modules than the ones described here.

In addition, the functionality attributed to the modules can be performed by other or different modules in other embodiments. Moreover, the description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:

identifying, using a hardware processor, a plurality of online services to which users sign on using a social sign-on account;

identifying, using the hardware processor, for each user of a plurality of the users, a plurality of content items that the user accesses;

grouping, using the hardware processor, the users into a plurality of groups according to the online services to which the users sign on using the social sign-on account;

associating, using the hardware processor, with each group of a plurality of the groups, a set of the identified content items that were accessed by the users within the group by (i) receiving a request for a first content item, the request originating from a web page of a first online service of the plurality of online services, (ii) determining, based on a referrer specified in the request, that the request originates from the first online service; and (iii) associating the first content item with groups of the plurality of groups that include the first online service;

identifying, using the hardware processor, for a first user, a first one of the groups into which the first user was grouped;

determining, using the hardware processor, from the first group, a first portion of the set of the identified content items that have not been previously accessed by the first user and a second portion of the set of the identified content items that have been previously accessed by the first user;

generating, using the hardware processor, a user interface associated with the first user, wherein the user interface presents the first portion of the set of the identified content items that have not been previously accessed by the first user and suppresses presentation of the second portion of the set of the identified content items that have been previously accessed by the first user based on the determination; and causing, using the hardware processor, the user interface to be presented on a computing device associated with the first user.

2. The computer-implemented method of claim 1, wherein identifying the first one of the groups comprises identifying, for each of the online services, whether the first user has signed on to the online service.

3. The computer-implemented method of claim 1, further comprising:
  identifying, from the content items, a first set of content items accessed by the users of a first group of the plurality of groups; and
  selecting, as the associated content items for the first group, ones of the identified first set of content items that are popular with the users of the first group.

4. The computer-implemented method of claim 1, further comprising:
  training a classifier for a first group of the groups using features of the videos associated with the first group;
  ranking a plurality of content items based on scores obtained by applying the trained classifier to the plurality of content items;
  selecting a plurality of highest ranking content items from the ranked content items; and
  selecting, as the associated content items for the first group, the selected plurality of highest-ranking content items.

5. The computer-implemented method of claim 1, wherein each of the groups corresponds to a distinct set of the online services, at least one of the distinct sets corresponding to a plurality of the online services.

6. The computer-implemented method of claim 1, wherein the content items comprise digital videos.

7. A non-transitory computer-readable storage medium comprising computer program instructions executable by a processor, the instructions comprising:
  instructions for identifying a plurality of online services to which users sign on using a social sign-on account;
  instructions for identifying, for each user of a plurality of the users, a plurality of content items that the user accesses;
  instructions for grouping the users into a plurality of groups according to the online services to which the users sign on using the social sign-on account;
  instructions for associating, with each group of a plurality of the groups, a set of the identified content items that were accessed by the users within the group by (i) receiving a request for a first content item, the request originating from a web page of a first online service of the plurality of online services, (ii) determining, based on a referrer specified in the request, that the request originates from the first online service; and (iii) associating the first content item with groups of the plurality of groups that include the first online service;
  instructions for identifying, for a first user, a first one of the groups into which the first user was grouped;
  instructions for determining, from the first group, a first portion of the set of the identified content items that have not been previously accessed by the first user and a second portion of the set of the identified content items that have been previously accessed by the first user;
  instructions for generating a user interface associated with the first user, wherein the user interface presents the first portion of the set of the identified content items that have not been previously accessed by the first user and suppresses presentation of the second portion of the set of the identified content items that have been previously accessed by the first user based on the determination; and
  instructions for causing the user interface to be presented on a computing device associated with the first user.

8. The non-transitory computer-readable storage medium of claim 7, wherein identifying the first one of the groups comprises identifying, for each of the online services, whether the first user has signed on to the online service.

9. The non-transitory computer-readable storage medium of claim 7, the instructions further comprising:
  instructions for identifying, from the content items, a first set of content items accessed by the users of a first group of the plurality of groups; and
  instructions for selecting, as the associated content items for the first group, ones of the identified first set of content items that are popular with the users of the first group.

10. The non-transitory computer-readable storage medium of claim 7, the instructions further comprising:
  training a classifier for a first group of the groups using features of the videos associated with the first group;
  ranking a plurality of content items based on scores obtained by applying the trained classifier to the plurality of content items;
  selecting a plurality of highest ranking content items from the ranked content items; and
  selecting, as the associated content items for the first group, the selected plurality of highest-ranking content items.

11. The non-transitory computer-readable storage medium of claim 7, wherein each of the groups corresponds to a distinct set of the online services, at least one of the distinct sets corresponding to a plurality of the online services.

12. The non-transitory computer-readable storage medium of claim 7, wherein the content items comprise digital videos.

13. A computer system comprising:
  a processor; and
  computer program instructions executable by the processor, the instructions comprising:
    instructions for identifying a plurality of online services to which users sign on using a social sign-on account;
    instructions for identifying a plurality of content items that the users access;
    instructions for grouping the users into a plurality of groups according to the online services to which the users sign on using the social sign-on account; and
    instructions for associating, with each of a plurality of the groups, a set of the identified content items by (i) receiving a request for a first content item, the request originating from a web page of a first online service of the plurality of online services, (ii) determining, based on a referrer specified in the request, that the request originates from the first online service; and (iii) associating the first content item with groups of the plurality of groups that include the first online service;
    instructions for identifying, for a first user, a first one of the groups into which the first user was grouped;
    instructions for determining, from the first group, a first portion of the set of the identified content items that have not been previously accessed by the first user and a second portion of the set of the identified content items that have been previously accessed by the first user;

instructions for generating a user interface associated with the first user, wherein the user interface presents the first portion of the set of the identified content items that have not been previously accessed by the first user and suppresses presentation of the second portion of the set of the identified content items that have been previously accessed by the first user based on the determination; and instructions for causing the user interface to be presented on a computing device associated with the first user.

14. The computer system of claim 13, the instructions further comprising:

instructions for identifying, for a first user, a first one of the groups into which the first user was grouped; and instructions for recommending, to the first user, ones of the content items that are associated with the first group and that the user has not already viewed.

15. The computer system of claim 13, wherein identifying the first one of the groups comprises identifying, for each of the online services, whether the first user has signed on to the online service.

16. The computer system of claim 13, the instructions further comprising:

instructions for identifying, from the content items, a first set of content items accessed by the users of a first group of the plurality of groups; and instructions for selecting, as the associated content items for the first group, ones of the identified first set of content items that are popular with the users of the first group.

17. The computer system of claim 13, the instructions further comprising:

instructions for training a classifier for a first group of the groups using features of the videos associated with the first group;

instructions for ranking a plurality of content items based on scores obtained by applying the trained classifier to the plurality of content items;

instructions for selecting a plurality of highest ranking content items from the ranked content items; and instructions for selecting, as the associated content items for the first group, the selected plurality of highest-ranking content items.

18. The computer system of claim 13, wherein each of the groups corresponds to a distinct set of the online services, at least one of the distinct sets corresponding to a plurality of the online services.

* * * * *